US011991347B2

(12) United States Patent
Jun et al.

(10) Patent No.: US 11,991,347 B2
(45) Date of Patent: May 21, 2024

(54) IMAGE PROCESSING DEVICE

(71) Applicant: SAMSUNG ELECTRONICS CO., LTD., Suwon-si (KR)

(72) Inventors: Sung Ho Jun, Hwaseong-si (KR); Chang Soo Park, Hwaseong-si (KR); Moon Kyu Song, Seoul (KR); Kyung Koo Lee, Hwaseong-si (KR); Kil Whan Lee, Seoul (KR); Hyuk Jae Jang, Suwon-si (KR); Kyung Ah Jeong, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/377,927

(22) Filed: Jul. 16, 2021

(65) Prior Publication Data
US 2021/0344900 A1 Nov. 4, 2021

Related U.S. Application Data

(63) Continuation of application No. 16/252,806, filed on Jan. 21, 2019, now Pat. No. 11,095,876.

(30) Foreign Application Priority Data

Jan. 26, 2018 (KR) .................. 10-2018-0010183
Feb. 8, 2018 (KR) .................. 10-2018-0015932
Apr. 10, 2018 (KR) .................. 10-2018-0041790

(51) Int. Cl.
H04N 19/103 (2014.01)
G06F 13/16 (2006.01)
(Continued)

(52) U.S. Cl.
CPC ....... H04N 19/103 (2014.11); G06F 13/1668 (2013.01); H04N 19/12 (2014.11);
(Continued)

(58) Field of Classification Search
CPC .. H04N 19/103; H04N 19/124; H04N 19/176; H04N 19/186; H04N 19/46; H04N 19/91; G06F 13/1668
See application file for complete search history.

(56) References Cited

U.S. PATENT DOCUMENTS 6,201,834 B1  3/2001  Zhu
8,300,959 B2  10/2012 Ahn et al.
(Continued)

FOREIGN PATENT DOCUMENTS

CN   104346597   2/2015
CN   104378644   2/2015
(Continued)

OTHER PUBLICATIONS

Search Report and Written Opinion dated Nov. 11, 2019 from Intellectual Property Office of Singapore in corresponding Patent Application No. 10201900626S.
(Continued)

Primary Examiner — Zhitong Chen
(74) Attorney, Agent, or Firm — F. Chau & Associates, LLC

(57) ABSTRACT

Provided is an image processing device configured to compress first image data. The image processing device includes an encoding circuit configured to compress the first image data into second image data including prediction data and residual data, compress the second image data into third image data by performing entropy encoding on the second image data, generate a header representing a compression ratio of the third image data, and store the third image data along with the header in a memory device as compressed first image data.

20 Claims, 9 Drawing Sheets

(51) Int. Cl.
*H04N 19/12* (2014.01)
*H04N 19/124* (2014.01)
*H04N 19/176* (2014.01)
*H04N 19/186* (2014.01)
*H04N 19/46* (2014.01)
*H04N 19/91* (2014.01)

(52) U.S. Cl.
CPC ......... *H04N 19/124* (2014.11); *H04N 19/176* (2014.11); *H04N 19/186* (2014.11); *H04N 19/46* (2014.11); *H04N 19/91* (2014.11)

(56) References Cited

U.S. PATENT DOCUMENTS

| | | | |
|---|---|---|---|
| 9,299,166 B2 | 3/2016 | Lachine et al. | |
| 9,349,156 B2 | 5/2016 | Croxford et al. | |
| 2007/0269115 A1* | 11/2007 | Wang | H04N 19/186 382/232 |
| 2011/0150072 A1* | 6/2011 | Han | H04N 19/124 375/240.01 |
| 2013/0083855 A1* | 4/2013 | Kottke | H04N 19/85 375/240.03 |
| 2014/0192075 A1 | 7/2014 | Stamoulis et al. | |
| 2015/0010062 A1* | 1/2015 | Gokhale | H04N 19/186 375/240.03 |
| 2015/0341660 A1 | 11/2015 | Joshi et al. | |
| 2016/0057437 A1 | 2/2016 | Jeong et al. | |
| 2016/0198154 A1 | 7/2016 | Hsiang | |
| 2016/0330455 A1* | 11/2016 | Lin | H04N 19/154 |
| 2017/0123662 A1* | 5/2017 | Sharon | G06F 3/0661 |
| 2017/0310963 A1 | 10/2017 | Park et al. | |
| 2018/0027096 A1 | 1/2018 | Michael et al. | |
| 2018/0293191 A1 | 10/2018 | Li | |
| 2019/0238833 A1 | 8/2019 | Jun et al. | |
| 2020/0059648 A1* | 2/2020 | Fu | H04N 19/13 |

FOREIGN PATENT DOCUMENTS

| | | |
|---|---|---|
| CN | 104885467 | 9/2015 |
| CN | 105608027 | 5/2016 |
| JP | 2013239893 | 11/2013 |
| KR | 10-2011-0071231 | 6/2011 |
| KR | 10-2016-0114570 | 10/2016 |

OTHER PUBLICATIONS

Search Report and Written Opinion dated Feb. 13, 2019 from Intellectual Property Office of Singapore in corresponding Patent Application No. 10201803733V.
Office Action dated Oct. 30, 2020 in corresponding U.S. Appl. No. 16/252,806.
TW 1st Office Action dated Apr. 29, 2022 in corresponding TW Application No. 108102299.
CN 1st Office Action dated Jan. 20, 2022 in corresponding CN Application No. 201910072938.7.
Notice of Allowance dated Aug. 4, 2022 in corresponding KR Appln. No. 10-2018-0041790.

* cited by examiner (Block size : 16 x 16 (Pixel x Pixel)
Format : YUV 420
Pixel depth : 8 bit
Mode : Separation mode)

| Header Index | Compressed Size (byte) | Compression ratio (%) |
|---|---|---|
| 0 | 0~32 | 87.5~100 |
| 1 | 33~64 | 75~87.5 |
| 2 | 65~96 | 62.5~75 |
| 3 | 97~128 | 50~62.5 |
| 4 | 129~160 | 37.5~50 |
| 5 | 161~192 | 25~37.5 |
| 6 | 193~224 | 12.5~25 |
| 7 | 225~256 | 0~12.5 |

FIG. 10
(Block size : 16 x 8 (Pixel x Pixel)
Format : YUV 420
Pixel depth : 8 bit
Mode : Partial Concatenation mode)
| Header Index | Compressed Size (byte) | Compression ratio (%) |
|---|---|---|
| 0 | 0~32 | 75~100 |
| 1 | 33~64 | 50~75 |
| 2 | 65~96 | 25~50 |
| 3 | 97~128 | 0~25 |
FIG. 11
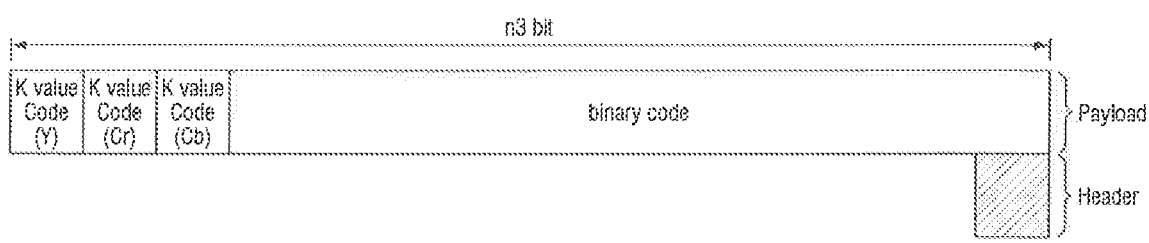
FIG. 12
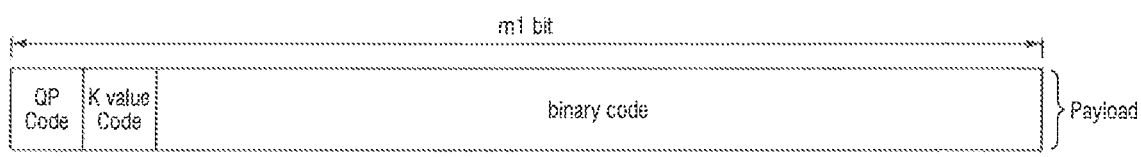

IMAGE PROCESSING DEVICE

CROSS-REFERENCE TO RELATED APPLICATIONS

This application is a continuation application of U.S. patent application Ser. No. 16/252,806 filed Jan. 21, 2019, which claims the benefit and priority under 35 U.S.C. 119 to Korean Patent Application No. 10-2018-0010183, filed on Jan. 26, 2018, Korean Patent Application No. 10-2018-0015932, filed on Feb. 8, 2018, and Korean Patent Application No. 10-2018-0041790, filed on Apr. 10, 2018, in the Korean Intellectual Property Office, the disclosures of which are incorporated by reference in their entireties herein.

BACKGROUND

1. Technical Field

The present disclosure relates to an image processing device.

2. Discussion of Related Art

More and more applications demand high-resolution video images and high-frame rate images. Accordingly, the amount of data accesses to a memory (i.e., bandwidth) storing these images by various multimedia intellectual property (IP) blocks of image processing devices has greatly increased.

Each image processing device has limited processing capability. When the bandwidth increases, the processing capability of the image processing device may reach this limit. Accordingly, a user of the image processing device may experience a decrease in speed while recording or playing a video image.

SUMMARY

At least one embodiment of the present inventive concept provides an image processing device having an improved processing speed.

According to an exemplary embodiment of the present inventive concept, there is provided an image processing device configured to compress first image data. The image processing device includes an encoding circuit configured to compress the first image data into second image data comprising prediction data and residual data, compress the second image data into third image data by performing entropy encoding on the second image data, generate a header representing a compression ratio of the third image data, and store the third image data along with the header in a memory device as compressed first image data.

According to exemplary embodiment of the present inventive concept, there is provided an image processing device configured to compress first image data. The image processing device includes an encoding circuit having a mode selection circuit configured to determine whether a first mode is set to a lossless compression mode or a lossy compression mode based on a received signal, a first logic circuit configured to compress the first image data into second image data comprising prediction data and residual data, a second logic circuit configured to quantize the second image data using at least one quantization parameter (QP), and a third logic circuit configured to performing entropy encoding on one of i) an output of the first logic circuit when the first mode is set to the lossless compression mode and ii) an output of the second logic circuit when the first mode is set to the lossy compression mode.

According to exemplary embodiment of the present inventive concept, there is provided an image processing device configured to decompress first compressed image data. The image processing device includes a mode selection circuit configured to set a first mode to lossless decompression when the first compressed image data was compressed in a lossless manner and set the first mode to lossy decompression when the first compressed image data was compressed in a lossy manner, a first logic circuit performing an entropy decoding on the first compressed image data, a second logic circuit performing an inverse quantization on an output of the first logic circuit when the first mode is set to lossy decompression, and a third logic circuit configured to perform a decompression by adding residual data to prediction data received in an output of the first logic circuit when the first mode is set to the lossless decompression, and perform the decompression by adding residual data to prediction data received in an output of the second logic circuit when the first mode is set to lossy decompression.

BRIEF DESCRIPTION OF THE DRAWINGS

The present invention will become apparent by describing in detail exemplary embodiments thereof with reference to the accompanying drawings in which:

FIG. 10 is a table for explaining a compression method of the losslessly compressed data of FIG. 9;

FIG. 11 illustrates the structure of data losslessly compressed by an image processing device according to an exemplary embodiment of the present inventive concept;

FIG. 12 illustrates the structure of data lossy compressed by an image processing device according to an exemplary embodiment of the present inventive concept;

DETAILED DESCRIPTION

An image processing device according to an exemplary embodiment of the inventive concept will now be described with reference to FIGS. 1 through 14.

Figure 1:
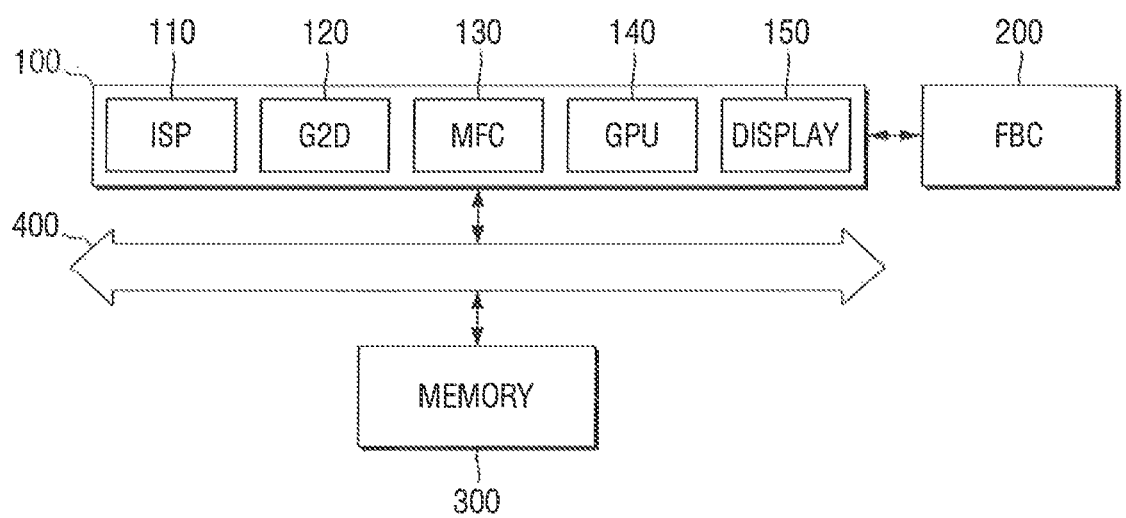
FIG. 1 is a block diagram of an image processing device according to an exemplary embodiment of the inventive concept.

FIG. 1 is a block diagram of an image processing device according to at least one embodiment of the inventive concept.

Referring to FIG. 1, the image processing device according to at least one embodiment of the inventive concept includes a multimedia intellectual property (IP) 100 (e.g., an IP core, and IP block, a circuit, etc.), a frame buffer compressor (FBC) 200 (e.g., a circuit, a digital signal processor, etc.), a memory 300, and a system bus 400.

In an exemplary embodiment, the multimedia IP 100 is part of the image processing device that directly executes the image processing of the image processing device. The multimedia IP 100 may include a plurality of modules for performing image recording and reproduction such as camcording, playback, etc. of video images.

The multimedia IP 100 receives first data (e.g., image data) from an external device such as a camera and converts the first data into second data. For example, the first data may be moving raw image data or raw static image data. The second data may be data generated by the multimedia IP 100 and may also include data resulting from the multimedia IP 100 processing the first data. The multimedia IP 100 may repeatedly store the second data in the memory 300 and update the second data through various steps. The second data may include all of the data used in these steps. The second data may be stored in the memory 300 in the form of third data. Therefore, the second data may be data before being stored in the memory 300 or after being read from the memory 300.

In an exemplary embodiment, the multimedia IP 100 includes an image signal processor (ISP) 110, a shake correction module (G2D) 120, a multi-format codec (MFC) 130, a graphics processing unit (GPU) 140, and a display 150. However, the present inventive concept is not limited to this case. That is, the multimedia IP 100 can include at least one of the ISP 110, the G2D 120, the MFC 130, the GPU 140, and the display 150 described above. In other words, the multimedia IP 100 may be implemented by a processing module that has to access the memory 300 in order to process data representing a moving image or a static image.

The ISP 110 receives the first data and converts the first data into the second data by pre-processing the first data. Here, the first data may be image source data in an RGB format. For example, the ISP 110 may convert the first data in the RGB format into the second data in a YUV format.

The RGB format refers to a data format in which colors are represented based on three primary colors of light. That is, an image is represented using three kinds of colors, i.e., red, green, and blue. On the other hand, the YUV format refers to a data format in which brightness, i.e., a luma signal and a chroma signal are represented separately. That is, Y denotes a luma signal, and U(Cb) and V(Cr) denote chroma signals, respectively. U denotes a difference between the luma signal and a blue signal component, and V denotes a difference between the luma signal and a red signal component. Here, items of Y. U (Cb), and V (Cr) may be defined as planes. For example, data about a luma signal may be referred to as data of a Y plane, and data about a chroma signal may be referred to as data of a U(Cb) plane or data of a V (Cr) plane.

Data in the YUV format may be obtained by converting data in the RGB format using a conversion formula. For example, a conversion formula such as Y=0.3R+0.59G+0.11 B, U=(B−Y)×0.493, V=(R−Y)×0.877 may be used to convert the data of the RGB format into the data of the YUV format.

Since the human eye is sensitive to luma signals but less sensitive to color signals, it may be easier to compress data in the YUV format than to compress data in the RGB format. Therefore, the ISP 110 may convert the first data in the RGB format into the second data in the YUV format.

After the ISP 110 converts the first data into the second data, it stores the second data in the memory 300.

The G2D 120 may perform shake correction of image data or moving image data. The G2D 120 may read the first data or the second data stored in the memory 300 to perform shake correction. Here, the shake correction refers to detecting shakes of a camera in moving image data and removing the shakes.

The G2D 120 may generate new second data or update the second data by correcting shakes in the first data or the second data and may store the generated or updated second data in the memory 300.

The MFC 130 may be a codec for compressing moving image data. Generally, moving image data is very large in size. Therefore, a compression module for reducing the size of the moving image data is needed. The moving image data may be compressed based on the associative relationship between a plurality of frames, and this compression may be performed by the MFC 130. The MFC 130 may read and compress the first data or may read and compress the second data stored in the memory 300.

The MFC 130 may generate new second data or update the second data by compressing the first data or the second data and store the new second data or the updated second data in the memory 300.

The GPU 140 may perform an arithmetic process to calculate and generate two-dimensional or three-dimensional graphics. The GPU 140 may calculate the first data or calculate the second data stored in the memory 300. The GPU 140 may be specialized in processing graphics data and may process graphics data in parallel.

The GPU 140 may generate new second data or update the second data by compressing the first data or the second data and store the new second data or the updated second data in the memory 300.

The display 150 may display the second data stored in the memory 300 on a screen.

The display 150 may display image data, i.e., the second data processed by other elements of the multimedia IP 100, that is, the ISP 110, the G2D 120, the MFC 130 and the GPU 140, on the screen. However, the present inventive concept is not limited to this case.

Each of the ISP 110, the G2D 120, the MFC 130, the GPU 140 and the display 150 of the multimedia IP 100 may operate individually. That is, each of the ISP 110, the G2D 120, the MFC 130, the GPU 140, and the display 150 may individually access the memory 300 to write or read data.

In an embodiment, the FBC 200 converts the second data into the third data by compressing the second data before the elements of the multimedia IP 100 access the memory 300 individually. The FBC 200 may transmit the third data to the multimedia IP 100, and the multimedia IP 100 may transmit the third data to the memory 300.

Therefore, the third data generated by the FBC 200 may be stored in the memory 300.

Conversely, the third data stored in the memory 300 may be loaded by the multimedia IP 100 and transmitted to the FBC 200. The FBC 200 may convert the third data into the second data by decompressing the third data. The FBC 200 may transmit the second data to the multimedia IP 100.

That is, whenever the ISP 110, the G2D 120, the MFC 130, the GPU 140 and the display 150 of the multimedia IP 100 access the memory 300 individually, the FBC 200 may compress the second data into the third data and transmit the third data to the memory 300. For example, after one of the components of the multimedia IP 100 generates and stores the second data in the memory 300, the frame buffer compressor 200 can compress the stored data and store the compressed data into the memory 300. Conversely, whenever a data request is made from the memory 300 to the ISP 110, the G2D 120, the MFC 130, the GPU 140 and the display 150 of the multimedia IP 100, the FBC 200 may decompress the third data into the second data and transmit the second data to each of the ISP 110, the G2D 120, the MFC 130, the GPU 140 and the display 150 of the multimedia IP 100.

The memory 300 may store the third data generated by the FBC 200 and provide the stored third data to the FBC 200 so that the FBC 200 can decompress the third data.

In an embodiment, the system bus 400 is connected to each of the multimedia IP 100 and the memory 300. Specifically, the ISP 110, the G2D 120, the MFC 130, the GPU 140 and the display 150 of the multimedia IP 100 may be individually connected to the system bus 400. The system bus 400 may serve as a path through which the ISP 110, the G2D 120, the MFC 130, the GPU 140 and the display 150 of the multimedia IP 100 and the memory 300 exchange data with each other.

In an embodiment, the FBC 200 is not connected to the system bus 400 and converts the second data into the third data or the third data into the second data when each of the ISP 110, the G2D 120, the MFC 130, the GPU 140 and the display 150 of the multimedia IP 100 accesses the memory 300.

Figure 2:
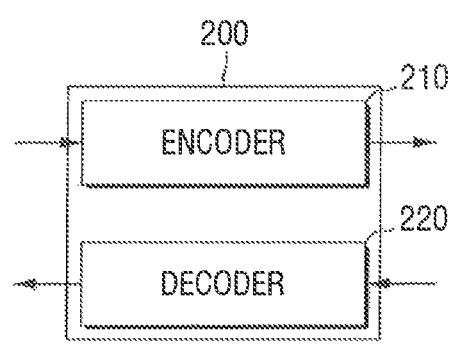
FIG. 2 is a detailed block diagram of a frame buffer compressor (FBC) illustrated in FIG. 1.

FIG. 2 is a detailed block diagram of the FBC 200 illustrated in FIG. 1.

Referring to FIG. 2, the FBC 200 includes an encoder 210 (e.g., an encoding circuit) and a decoder 220 (e.g., a decoding circuit).

The encoder 210 may receive the second data from the multimedia IP 100 and generate the third data. Here, the second data may be transmitted from each of the ISP 110, the G2D 120, the MFC 130, the GPU 140 and the display 150 of the multimedia IP 100. The third data may be transmitted to the memory 300 through the multimedia IP 100 and the system bus 400.

Conversely, the decoder 220 may decompress the third data stored in the memory 300 into the second data. The second data may be transmitted to the multimedia IP 100. Here, the second data may be transmitted to each of the ISP 110, the G2D 120, the MFC 130, the GPU 140 and the display 150 of the multimedia IP 100.

Figure 3:
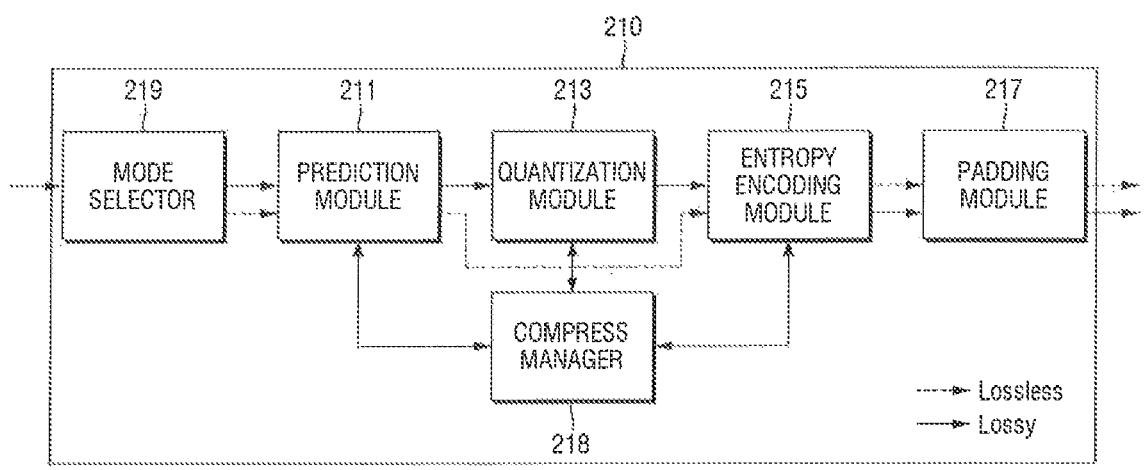
FIG. 3 is a detailed block diagram of an encoder illustrated in FIG. 2.

FIG. 3 is a detailed block diagram of the encoder 210 illustrated in FIG. 2.

Referring to FIG. 3, the encoder 210 includes a rust mode selector 219 (e.g., a mode selection circuit), a prediction module 211 (e.g., a logic circuit or processor), a quantization module 213 (e.g., a logic circuit or processor), an entropy encoding module 215 (e.g., a logic circuit or processor), and a padding module 217 (e.g., a logic circuit or processor).

In an embodiment, the first mode selector 219 determines whether the encoder 210 will operate in a lossless mode (e.g., lossless compression) or a lossy mode (e.g., lossy compression). When the encoder 210 operates in the lossless mode based on the determination result of the first mode selector 219, the second data may be compressed along a lossless path of FIG. 3. When the encoder 210 operates in the lossy mode, the second data may be compressed along a lossy path.

The first mode selector 219 may receive a signal from the multimedia IP 100 used to determine whether lossless compression or lossy compression will be performed. Here, the lossless compression denotes compression without loss of data and has a compression ratio that varies depending on data. On the other hand, the lossy compression denotes compression in which data is partially lost. The lossy compression has a higher compression ratio than the lossless compression and has a preset fixed compression ratio.

In the case of the lossless mode, the first mode selector 219 enables the second data to flow to the prediction module 211, the entropy encoding module 215 and the padding module 217 along the lossless path. Conversely, in the case of the lossy mode, the first mode selector 219 enables the second data to flow to the prediction module 211, the quantization module 213 and the entropy encoding module 215 along the lossy path.

The prediction module 211 converts the second data into predicted image data. The predicted image data is a compressed representation of the second data as a combination of prediction data and residual data. In an embodiment, the prediction data is image data of one pixel of the image data and the residual data is created from the differences between the prediction data and the image data of the pixels of the image data that are adjacent the one pixel. For example, if the image data of the one pixel has a value of 0 to 255, 8 bits may be needed to represent the value. When the adjacent pixels have similar values to that of the one pixel, the residual data of each of the adjacent pixels is much smaller than the prediction data. For example, if an adjacent pixel has a similar value, only a difference (i.e., a residual) from the value of the adjacent pixel can be represented without loss of data, and the number of bits of data needed to represent the difference may be much smaller than 8 bits. For example, when pixels having values of 253, 254 and 255 are arranged successively, if prediction data is 253, a residual data representation of (253(prediction), 1(residual), 2(residual)) may be sufficient, and the number of bits per pixel needed for this residual data representation may be 2 bits which is much smaller than 8 bits. For example, 24 bits of data of 253, 254, and 255 can be reduced to 12 bits due to 8 bit prediction data of 253 (11111101), 2 bit residual data of 254−251=1 (01), and 2 bit residual data of 255−253=2 (10).

Therefore, the prediction module 211 may compress the overall size of the second data by dividing the second data into prediction data and residual data. Various methods can be used to determine the prediction data.

The prediction module 211 may perform prediction on a pixel-by-pixel basis or on a block-by-block basis. Here, a block may be an area formed by a plurality of adjacent pixels. For example, prediction on a pixel basis could mean that all the residual data is created from one of the pixels, and prediction on the block basis could mean that residual data is created for each block from a pixel of the corresponding block.

The quantization module 213 may further compress the second data compressed by the prediction module 211. The quantization module 213 may remove lower bits of the second data using a preset quantization parameter (QP) (e.g., quantizing the second data using the QP). For example, if the prediction data is 253 (11111101), the prediction data can be reduced from 8 bits to 6 bits by removing the lower 2 bits, which results in prediction data of 252 (111111). Specifically, a representative value may be selected by multiplying the data by a QP, where numbers below a decimal point are discarded, thus causing a loss. If pixel data has a value of 0 to $2^8-1$ (=255), the QP may be defined as $1/(2^n-1)$ (where n is an integer of 8 or less). However, the current embodiments are not limited to this case.

Here, since the removed lower bits are not restored later, they are lost. Therefore, the quantization module 213 is utilized only in the lossy mode. The lossy mode may have a relatively higher compression ratio than the lossless mode and may have a preset fixed compression ratio. Therefore, information about the compression ratio is not needed later.

The entropy encoding module 215 may compress, through entropy coding, the second data compressed by the quantization module 213 in the lossy mode or the second data compressed by the prediction module 211 in the lossless mode. In the entropy coding, the number of bits may be allocated according to frequency.

In an embodiment, the entropy encoding module 215 compresses the second data using Huffman coding. In an alternative embodiment, the entropy encoding module 215 compresses the predicted image data through exponential Golomb coding or Golomb rice coding. In an embodiment, the entropy encoding module 215 generates a table using k values, it compresses the predicted image data using the generated table. The k values may be entropy encoding values using in the entropy encoding.

The padding module 217 may perform padding on the second data compressed by the entropy encoding module 215 in the lossless mode. Here, the padding may refer to adding meaningless data in order to fit a specific size. This will be described in more detail later.

The padding module 217 may be activated not only in the lossless mode but also in the lossy mode. In the lossy mode, the second data may be compressed by the quantization module 213 more than an intended compression ratio. In this case, the second data may be passed through the padding module 217 even in the lossy mode, converted into the third data and then transmitted to the memory 300. In an exemplary embodiment, the padding module 217 is omitted so that no padding is performed.

A compress manager 218 determines a combination of a QP table and an entropy table used for quantization and entropy coding, respectively, and controls the compression of the second data according to the determined combination of the QP table and the entropy table.

In this case, the first mode selector 219 determines that the encoder 210 will operate in the lossy mode. Accordingly, the second data is compressed along the lossy path of FIG. 3. That is, the compress manager 218 determines that a combination of a QP table and an entropy table is needed and compresses the second data according to the determined combination of the QP table and the entropy table based on the premise that the FBC 200 compresses the second data using a lossy compression algorithm.

Specifically, the QP table may include one or more entries, and each of the entries may include a QP used to quantize the second data.

In an embodiment, the entropy table refers to a plurality of code tables identified by k values to perform an entropy coding algorithm. The entropy table that can be used in some embodiments may include at least one of an exponential Golomb code and a Golomb rice code.

The compress manager 218 determines a QP table including a predetermined number of entries, and the FBC 200 quantizes predicted second data using the determined QP table. In addition, the compress manager 218 determines an entropy table using a predetermined number of k values, and the FBC 200 performs entropy coding on the quantized second data using the determined entropy table. That is, the FBC 200 generates the third data based on a combination of a QP table and an entropy table determined by the compress manager 218.

Then, the FBC 200 may write the generated third data into the memory 300. In addition, the FBC 200 may read the third data from the memory 300, decompress the read third data, and provide the decompressed third data to the multimedia IP 100.

Figure 4:
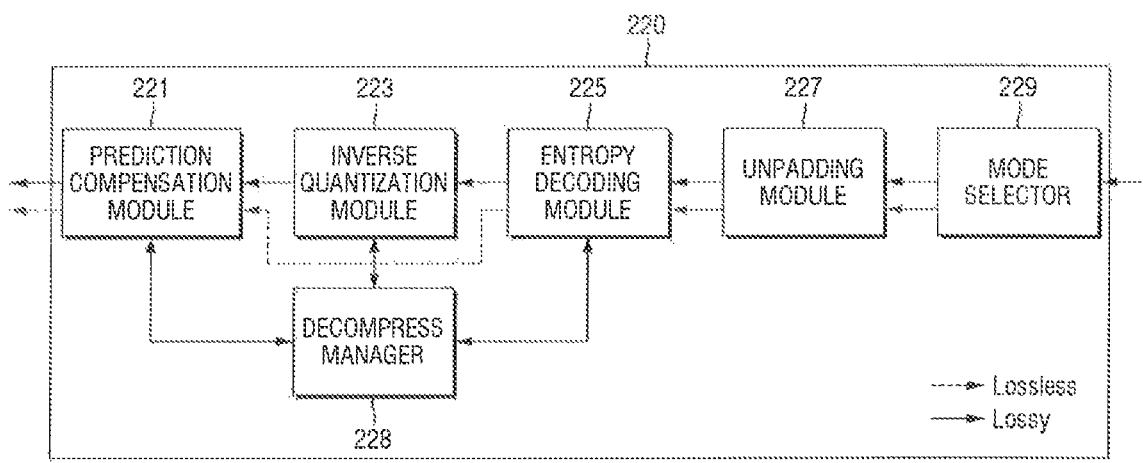
FIG. 4 is a detailed block diagram of a decoder illustrated in FIG. 2.

FIG. 4 is a detailed block diagram of the decoder 220 illustrated in FIG. 2.

Referring to FIGS. 3 and 4, the decoder 220 includes a second mode selector 229 (e.g., a mode selection circuit), an unpadding module 227 (e.g., a logic circuit or processor), an entropy decoding module 225 (e.g., a logic circuit), an inverse quantization module 223 (e.g., a logic circuit or processor), and a prediction compensation module 221 (e.g., a logic circuit or processor).

The second mode selector 229 determines whether the third data stored in the memory 300 has been generated through lossless compression or lossy compression of the second data. In an exemplary embodiment, the second mode selector 229 determines whether the third data has been generated by compressing the second data in the lossless mode or the lossy mode based on the presence or absence of a header. In an embodiment, the third data was compressed in a lossy mode when the third data includes at least one quantization parameter, and was compressed in a lossless mode when the third data includes no quantization parameters. In another embodiment, the compressed data is stored with a flag indicating whether the data was compressed in a lossy or lossless manner.

If the third data has been generated by compressing the second data in the lossless mode, the second mode selector 229 enables the third data to flow to the unpadding module 227, the entropy decoding module 225 and the prediction compensation module 221 along a lossless path. Conversely, if the third data has been generated by compressing the second data in the lossy mode, the second mode selector 229 enables the third data to flow to the entropy decoding module 225, the inverse quantization module 223 and the prediction compensation module 221 along a lossy path.

The unpadding module 227 may remove a portion of data which has been padded by the padding module 217 of the encoder 210. The unpadding module 227 may be omitted when the padding module 217 is omitted.

The entropy decoding module 225 may decompress data which has been compressed by the entropy encoding module 215. The entropy decoding module 225 may perform decompression using Huffman coding, exponential Golomb coding, or Golomb rice coding.

Since the third data includes k values, the entropy decoding module 225 may perform decoding using the k values.

The inverse quantization module 223 may decompress data which has been compressed by the quantization module 213. The inverse quantization module 223 may restore the second data compressed by the quantization module 213 using a predetermined quantization parameter (QP). For example, the inverse quantization module 223 may perform an inverse quantization operation on the output of the entropy decoding module 225. However, the inverse quantization module 223 cannot completely recover the data lost in the compression process. Therefore, the inverse quantization module 223 is only in the lossy mode.

The prediction compensation module 221 may perform prediction compensation to recover data represented as prediction data and residual data by the prediction module 211. For example, the prediction compensation module 221 may convert a residual data representation of (253(prediction), 1(residual), 2(residual)) into (253, 254, 255). For example, the prediction compensation module 221 may restore the data by adding the residual data to the prediction data.

The prediction compensation module 221 may restore data predicted on a pixel-by-pixel basis or a block-by-block basis by the prediction module 211. Accordingly, the second data may be restored or the third data may be decompressed and then transmitted to the multimedia IP 100.

A decompress manager 228 may perform an operation to appropriately reflect a combination of a QP table and an entropy table, which has been determined by the compress manager 218 to compress the second data as described above with reference to FIG. 3, in the decompression of the third data.

In an exemplary embodiment, the second data of the image processing device is data in the YUV format. Here, the data in the YUV format may have a YUV 420 format or a YUV 422 format.

Figure 5:
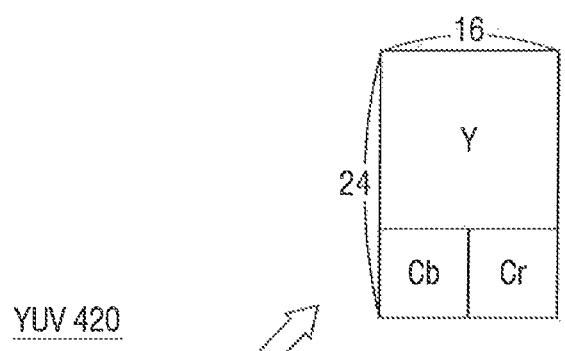
FIG. 5 is a conceptual diagram for explaining three operation modes for a YUV 420 format data of the image processing device according to an exemplary embodiment of the inventive concept.
Figure 5:
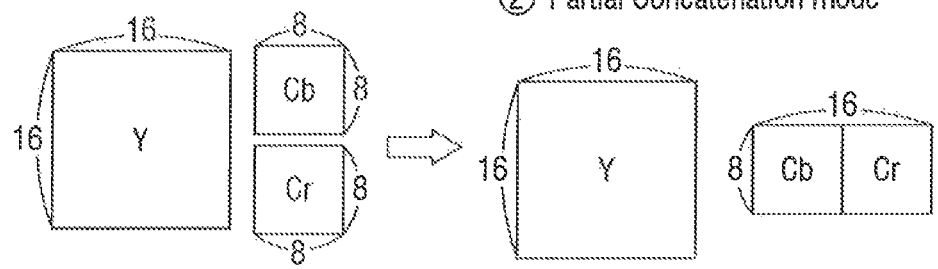
Figure 5:
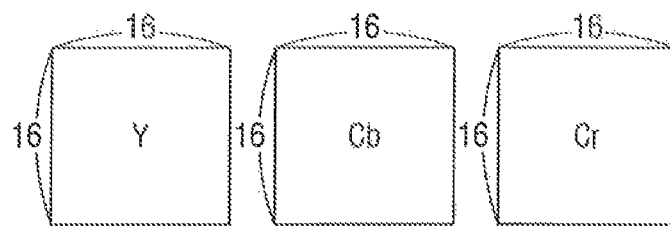

FIG. 5 is a conceptual diagram for explaining three operation modes for the YUV 420 data format processed by an image processing device according to an exemplary embodiment of the inventive concept.

Referring to FIGS. 1 through 5, the encoder 210 and the decoder 220 of the FBC 200 may have three operation modes. In FIG. 5, the second data in the YUV 420 format has a 16×16 luma signal block Y, an 8×8 first chroma signal block Cb or U, and an 8×8 second chroma signal block Cr or V. Here, the size of each block denotes how many rows and columns of pixels are arranged, and the 16×16 size denotes the size of a block composed of 16 rows and 16 columns of pixels.

The FBC 200 may include three operation modes: a concatenation mode ①, a partial concatenation mode ②, and a separation mode ③. These three modes are about compression formats of data and may be operation modes determined separately from the lossy mode and the lossless mode. In an exemplary embodiment, only two of the three operation modes are available. In a further exemplary embodiment, only one of three operation modes are available.

The concatenation mode ① is an operation mode for compressing and decompressing the luma signal block Y, the first chroma signal block Cb and the second chroma signal block Cr together. That is, in the concatenation mode ①, a unit block of compression is a block in which the luma signal block Y, the first chroma signal block Cb and the second chroma signal block Cr are combined as illustrated in FIG. 5. Accordingly, the unit block of compression may have a size of 16×24. For example, a single compression operation may be used to compress a block of data including the luma signal block Y, the first chroma signal block Cb and the second chroma signal block Cr.

In the partial concatenation mode ②, the first chroma signal block Cb and the second chroma signal block Cr are combined with each other and compressed and decompressed together, and the luma signal block Y is separately compressed and decompressed.

Accordingly, the luma signal block Y may have its original size of 16×16, and a block in which the first chroma signal block Cb and the second chroma signal block Cr are combined may have a size of 16×8. For example, a first compression operation may be used to compress the luma signal block Y and a second compression operation may be used to compress a block of data including the first chroma signal block Cb and the second chroma signal block Cr.

The separation mode ③ is an operation mode for separately compressing and decompressing the luma signal block Y, the first chroma signal block Cb, and the second chroma signal block Cr. Here, in order to make unit blocks of compression and decompression equal in size, the luma signal block Y is maintained at its original size of 16×16, and the first chroma signal block Cb and the second chroma signal block Cr are each enlarged to a size of 16×16. For example, a first compression operation may be used to compress the luma signal block Y, a second compression operation may be used to compress the first chroma signal block Cb, and a third compression operation may be used to compress the second chroma signal block Cr.

Accordingly, if the number of the luma signal blocks Y is N, the number of the first chroma signal blocks Cb and the number of the second chroma signal blocks Cr may each be reduced to N/4.

When the FBC 200 of the image processing device according to an exemplary embodiment of the inventive concept operates in the concatenation mode ①, all the necessary data can be read through a single access request to the memory 300. In particular, when the multimedia IP 100 needs data in the RGB format, not in the YUV format, it is advantageous for the FBC 200 to operate in the concatenation mode ①. This is because all of the luma signal block Y, the first chroma signal block Cb and the second chroma signal block Cr can be obtained at a time in the concatenation mode ① and because all of the luma signal block Y, the first chroma signal block Cb and the second chroma signal block Cr are needed to obtain RGB data.

The separation mode ③ may require less hardware resources when the unit block of compression is smaller in the concatenation mode ①. Therefore, the separation mode ③ may be more advantageous when the multimedia IP 100 needs data in the YUV format, not in the RGB format.

Finally, the partial concatenation mode ② is a compromise between the concatenation mode ① and the separation mode ③. The partial concatenation mode ② requires less hardware resources than the concatenation mode ① and makes less access requests (two access requests) to the memory 300 than the separation mode ③ even when RGB data is needed.

The first mode selector 219 determines in which of the three modes, i.e., the concatenation mode ①, the partial concatenation mode ② and the separation mode ③ the second data will be compressed. The first mode selector 219 may receive from the multimedia IP 100 a signal indicating which of the concatenation mode ①, the partial concatenation mode ② and the separation mode ③ will be executed. For example, the signal may be set to a first voltage level to indicate the concatenation mode, a second voltage level to indicate the partial concatenation mode, and a third voltage level to indicate the separate mode, where the first through third voltage levels differ from one another.

The second mode selector 229 may decompress the third data according to which of the concatenation mode ①, the partial concatenation mode ② and the separation mode ③ the second data has been compressed into the third data. For example, if the second data was compressed using the concatenation mode, the second mode selector 229 can make a single access to retrieve compressed data including the luma signal block Y, the first chroma signal block Cb and the second chroma signal block Cr. For example, if the second data was compressed using the partial concatenation mode, the second mode selector 229 can make two accesses to retrieve first compressed data including the luma signal block Y and second compressed data including the first chroma signal block Cb and the second chroma signal block Cr. For example, if the second data was compressed using the separation mode, the second mode selector 229 can make three accesses to retrieve first compressed data including the luma signal block Y, second compressed data including the first chroma signal block Cb and third compressed data including the second chroma signal block Cr.

Figure 6:
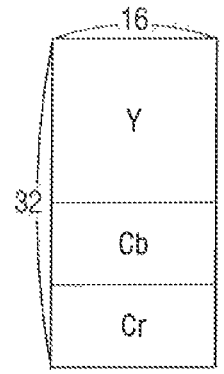
FIG. 6 is a conceptual diagram for explaining three operation modes for a YUV 422 format data of the image processing device according to an exemplary embodiment of the inventive concept.
Figure 6:
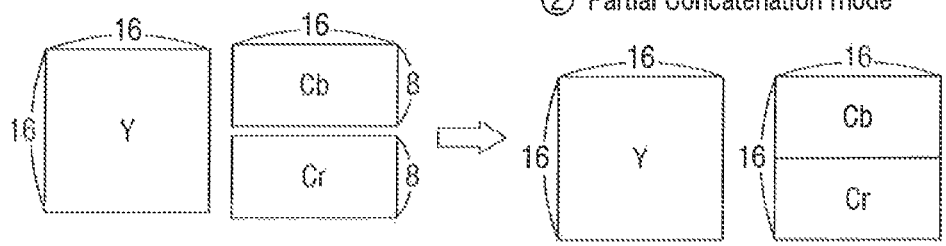
Figure 6:
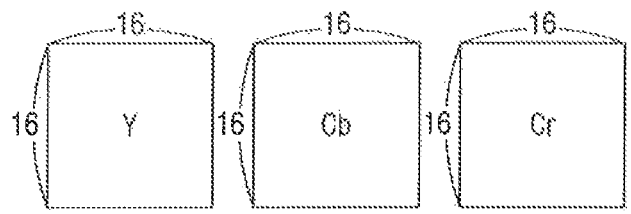

FIG. 6 is a conceptual diagram for explaining three operation modes for the YUV 422 data format of the image processing device according to an exemplary embodiment of the inventive concept.

Referring to FIGS. 1 through 4 and 6, the encoder 210 and the decoder 220 of the FBC 200 may also have three operation modes for the YUV 422 format. In FIG. 6, the second data in the YUV 422 format has a 16×16 luma signal block Y and a 16×8 first chroma signal block Cb or U and a 16×8 second chroma signal block Cr or V.

In a concatenation mode ①, a unit block of compression is a block in which the luma signal block Y, the first chroma signal block Cb and the second chroma signal block Cr are combined. Accordingly, the unit block of compression may have a size of 16×32.

In a partial concatenation mode ②, the first chroma signal block Cb and the second chroma signal block Cr are combined with each other and compressed and decompressed together, and the luma signal block Y is separately compressed and decompressed.

Accordingly, the luma signal block Y may have its original size of 16×16, and a block in which the first chroma signal block Cb and the second chroma signal block Cr are combined may have a size of 16×16. Therefore, the size of the luma signal block Y may be equal to the size of the block in which the first chroma signal block Cb and the second chroma signal block Cr are combined.

A separation mode ③ is an operation mode for separately compressing and decompressing the luma signal block Y, the first chroma signal block Cb, and the second chroma signal block Cr. Here, in order to make unit blocks of compression and decompression equal in size, the luma signal block Y is maintained at its original size of 16×16, and the first chroma signal block Cb and the second chroma signal block Cr are each enlarged to a size of 16×16.

Accordingly, if the number of the luma signal blocks Y is N, the number of the first chroma signal blocks Cb and the number of the second chroma signal blocks Cr are each reduced to N/2.

Figure 7:
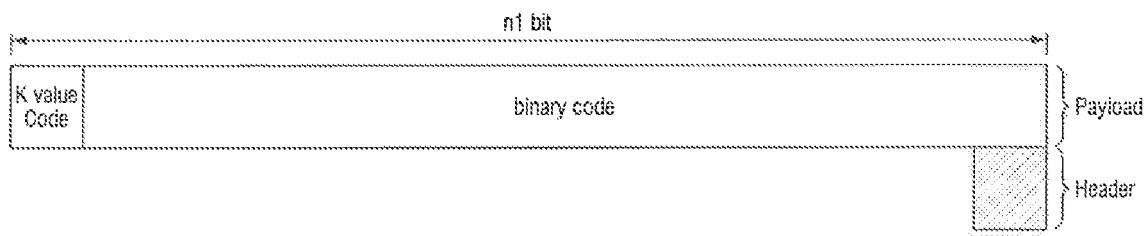
FIG. 7 illustrates the structure of data losslessly compressed by an image processing device according to an exemplary embodiment of the present inventive concept.
Figures 8, 9:
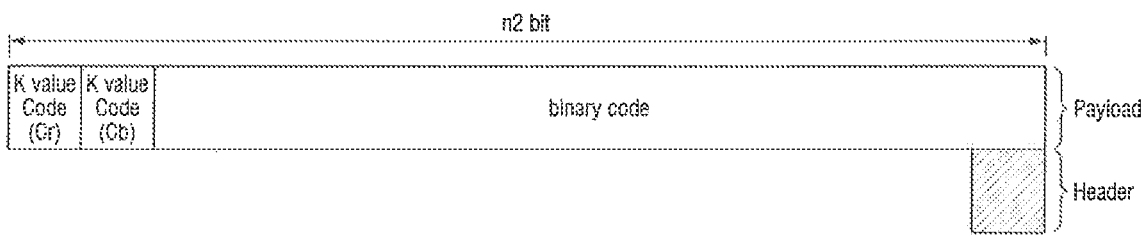
FIG. 8 is a table for explaining a compression method of the losslessly compressed data of FIG. 7.
FIG. 9 illustrates the structure of data losslessly compressed by an image processing device according to an exemplary embodiment of the present inventive concept.

FIG. 7 illustrates the structure of data losslessly compressed by an image processing device according to an exemplary embodiment of the present inventive concept. FIG. 8 is a table for explaining a compression method of the losslessly compressed data of FIG. 7.

Referring to FIGS. 1 through 8, the third data (i.e., the compressed data) includes a payload and a header.

The header indicates a compression ratio, and the payload includes actual compressed data and values necessary for decompression.

In FIG. 8, a table for explaining lossless compression of a 16×16 block is illustrated by way of example. Since the data format is YUV 420 and the operation mode is the separation mode ③, the luma signal block Y, the first chroma signal block Cb or the second chroma signal block Cr of FIG. 5 may correspond to this table. A pixel depth denotes a bit value of a value represented in one pixel. For example, a pixel depth of 8 bits is required to represent a value of 0 to 255. Thus, in the example of FIG. 8, a value represented in each pixel may be 0 to 255.

In the memory 300, the size of data that can be accessed at a time hardware-wise is predetermined. The size of a data access unit of the memory 300 may denote the size of data that can be accessed in the memory 300. In FIG. 8, it will be assumed for convenience that the size of the data access unit of the memory 300 is 32 bytes.

One pixel may have data of 8 bits. i.e., 1 byte, and a 16×16 block may have data of a total of 256 bytes. That is, the size of the second data (i.e., the uncompressed data) may be 256 bytes.

In the case of lossless compression, the size of compressed data may be different each time. In order to read the compressed data from the memory 300, the size of the compressed data must be recorded separately. However, if the size of the compressed data is recorded as it is, the compression efficiency may be reduced by the recorded size. Therefore, the compression ratio may be standardized to improve the compression efficiency.

Specifically, in FIG. 8, the range of the compression ratio is defined based on 32 bytes which is the size of the data access unit of the memory 300. That is, if the size of the compressed data is 0 to 32 bytes, the compression ratio is 100 to 87.5%. In this case, an operation of adjusting the compression ratio to 87.5% (i.e., an operation of adjusting the size of the compressed data to 32 bytes) may be performed, and 0 may be recorded in the header. Likewise, if the size of the compressed data is 161 to 192 bytes, the compression ratio is 37.5 to 25%. In this case, an operation of adjusting the compression ratio to 25% (i.e., an operation of adjusting the size of the compressed data to 192 bytes) may be performed, and 5 may be recorded in the header.

The padding module 217 of FIG. 3 may perform the operation of adjusting the size of the compressed data to a maximum size of a corresponding range. That is, if the size of the compressed data is 170 bytes, since 170 bytes is between 161 bytes and 192 bytes, a padding operation of adding "0" of 22 bytes may be performed to adjust the size of the compressed data to 192 bytes.

The compressed data whose size has been adjusted to a maximum size of a corresponding range by the padding module 217 may become the payload of the third data. Accordingly, the size (n1 bits) of the payload may be an integer multiple of the size of the data access unit of the memory 300.

The header may include a header index of FIG. 8. The size of the header may vary depending on the size of the compressed data, but may be 3 bits in the case of FIG. 8 because the header represents only 0 to 7.

In an exemplary embodiment, the header and the payload are stored in different areas of the memory 300. That is, the header may be stored adjacent to another header, and the payload may be stored adjacent to another payload.

In an embodiment, the payload includes a binary code and a k value code. The binary code may represent the compressed second data. The k value code may represent a k value determined by the entropy encoding module 215.

The binary code may include data values of the entire block. Therefore, the binary code may successively include data of each pixel included in the block.

Since the current mode is the separation mode ③, the k value code is a k value for any one of the luma signal block Y, the first chroma signal block Cb and the second chroma signal block Cr.

FIG. 9 illustrates the structure of data losslessly compressed by an image processing device according to an exemplary embodiment of the present inventive concept. FIG. 10 is a table for explaining a compression method of the losslessly compressed data of FIG. 9.

In FIG. 10, a table for explaining lossless compression of a 16×8 block is illustrated by way of example. Since the data format is YUV 420 and the operation mode is the partial concatenation mode ②, a block in which the first chroma signal block Cb and the second chroma signal block Cr of FIG. 5 are combined may correspond to this table. In FIG. 10, it will be assumed for convenience that the size of the data access unit of the memory 300 is 32 bytes.

The 16×8 block may have data of a total of 128 bytes. That is, the size of the second data may be 128 bytes.

The range of the compression ratio is defined based on 32 bytes which is the size of the data access unit of the memory 300. That is, if the size of the compressed data is 0 to 32 bytes, the compression ratio is 100 to 75%. In this case, an operation of adjusting the compression ratio to 75% (i.e., an operation of adjusting the size of the compressed data to 32 bytes) may be performed, and 0 may be recorded in the header. Likewise, if the size of the compressed data is 97 to 128 bytes, the compression ratio is 25 to 0%. In this case, an operation of adjusting the compression ratio to 0% (i.e., an operation of adjusting the size of the compressed data to 128 bytes) may be performed, and 3 may be recorded in the header. This operation may be performed by the padding module 217 of FIG. 3.

Referring to FIG. 9, the compressed data whose size has been adjusted to a maximum size of a corresponding range by the padding module 217 may become the payload of the third data. Accordingly, the size (n2 bits) of the payload may be an integer multiple of the size of the data access unit of the memory 300.

In an embodiment, the payload includes a binary code and a k value code. Since the current mode is the partial concatenation mode ② and the 16×8 block is a block in which the first chroma signal block Cb and the second chroma signal block Cr are combined, the k value code includes a k value code of the first chroma signal block Cb and a k value code of the second chroma signal block Cr. The arrangement order of the k value code of the first chroma signal block Cb and the k value code of the second chroma signal block Cr can vary.

A payload of an image processing device according to an exemplary embodiment includes only one k value code without having the k value code of the first chroma signal block Cb and the k value code of the second chroma signal block Cr separately. In this case, the k value code is the same in the first chroma signal block Cb and the second chroma signal block Cr.

Since FIG. 9 illustrates the data structure of the block in which the first chroma signal block Cb and the second chroma signal block Cr are combined in the partial concatenation mode ②, the binary code may include both data about the first chroma signal block Cb and data about the second chroma signal block Cr.

In the binary code, the data about the first chroma signal block Cb may be placed first for all pixels, and then the data about the second chroma signal block Cr may be placed for all pixels. That is, the data of the first chroma signal block Cb and the data of the second chroma signal block Cr may be arranged separately. The arrangement order of the data of the first chroma signal block Cb and the data of the second chroma signal block Cr can vary.

Alternatively, a binary code of an image processing device according to an exemplary embodiment has an interleaving structure in which the data of the first chroma signal block Cb and the data of the second chroma signal block Cr are arranged successively for one pixel and the data of the first chroma signal block Cb and the data of the second chroma signal block Cr are successively arranged for another pixel.

This structure does not need to be considered in the separation mode ③ because only one plane is included in the separation mode ③. However, since a plurality of planes are included in the concatenation mode ① and the partial concatenation modes ②, the interleaving structure can be used.

Therefore, in the concatenation mode ①, the data of the luma signal block Y for all pixels, the data of the first chroma signal block Cb for all pixels, and the data of the second chroma signal block Cr may also be arranged separately in the binary code. The arrangement order of the data of the luma signal block Y, the data of the first chroma signal block Cb, and the data of the second chroma signal block Cr can vary.

Alternatively, in the binary code of the concatenation mode ①, the data of the luma signal block Y, the data of the first chroma signal block Cb, and the data of the second chroma signal block Cr may be arranged for one pixel. Then, the data of the luma signal block Y, the data of the first chroma signal block Cb, and the data of the second chroma signal block Cr may be arranged for another pixel.

That is, in the binary code, data may be arranged for each plane or may be arranged for each pixel (the interleaving structure).

FIG. 11 illustrates the structure of data losslessly compressed by an image processing device according to an exemplary embodiment of the present inventive concept.

Referring to FIG. 11, if the current mode is the concatenation mode ①, a block in which the luma signal block Y, the first chroma signal block Cb and the second chroma signal block Cr are combined is compressed. Therefore, a k value code may include a k value code of the luma signal block Y, a k value code of the first chroma signal block Cb, and a k value code of the second chroma signal block Cr. Here, the arrangement order of the k value code of the luma signal block Y, the k value code of the first chroma signal block Cb, and the k value code of the second chroma signal block Cr can vary.

A payload of an image processing device according to an embodiment includes only one k value code without having the k value code of the luma signal block Y, the k value code of the first chroma signal block Cb and the k value code of the second chroma signal block Cr separately. In this case, the k value code is the same in the luma signal block Y, the first chroma signal block Cb, and the second chroma signal block Cr.

Alternatively, if only two of the three planes share the same k value code, a total of two k value codes may be included in the payload.

In an embodiment, the size (n3 bits) of the payload including the binary code and the k value code is an integer multiple of the size of the data access unit of the memory 300.

FIG. 12 illustrates the structure of data lossy compressed by an image processing device according to an exemplary embodiment of the present inventive concept.

Referring to FIG. 12, the third data generated by compressing the second data in the lossy mode includes only a payload without a header.

In an embodiment, the payload includes a binary code, a k value code, and a QP code.

In an embodiment, the QP code includes a QP used by the quantization module 213 in FIG. 3.

In an embodiment, the inverse quantization module 223 of the decoder 220 decompresses data compressed by the quantization module 213 using the QP code.

The third data of FIG. 12 may be the structure of the third data corresponding to the separation mode ③. Therefore, the k value code and the QP code may be present only for one of the luma signal block Y, the first chroma signal block Cb. and the second chroma signal block Cr.

Since the compression ratio is fixed in the lossy mode, the size of the third data, that is, the size (ml bits) of the payload may be fixed.

Figure 13:
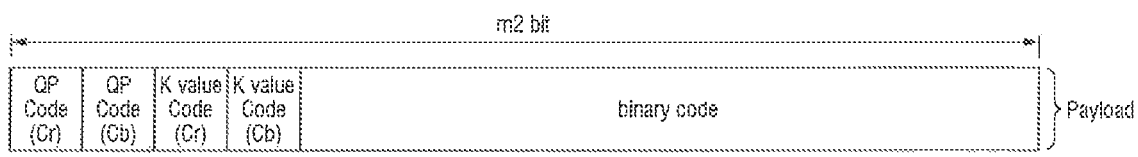
FIG. 13 illustrates the structure of data lossy compressed by an image processing device according to an exemplary embodiment of the present inventive concept.

FIG. 13 illustrates the structure of data lossy compressed by an image processing device according to an exemplary embodiment of the present inventive concept.

Referring to FIG. 13, a payload includes a binary code, a k value code, and a QP code. The third data of FIG. 13 may be the structure of the third data of a block in which the first chroma signal block Cb and the second chroma signal block Cr are combined in the partial concatenation mode ②. Therefore, there are two k value codes and two QP codes. Specifically, the payload includes a k value code of the first chroma signal block Cb, a k value code of the second chroma signal block Cr, a QP code of the first chroma signal block Cb and a QP code of the second chroma signal block Cr.

The order of the k value code of the first chroma signal block Cb, the k value code of the second chroma signal block Cr, the QP code of the first chroma signal block Cb, the QP code of the second chroma signal block Cr, and the binary code (i.e., the compressed data) can vary.

In an embodiment, the two k value codes are shared. Therefore, when the same k value code is shared, there is only one k value code.

Likewise, the two QP codes may be shared. Therefore, when the same QP code is shared, there is only one QP code.

Figure 14:
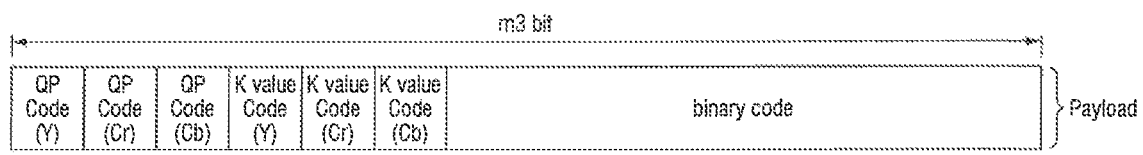
FIG. 14 illustrates the structure of data lossy compressed by an image processing device according to an exemplary embodiment of the present inventive concept.

FIG. 14 illustrates the structure of data lossy compressed by an image processing device according to an exemplary embodiment of the present inventive concept.

Referring to FIG. 14, a payload includes a binary code, a k value code, and a QP code. The third data of FIG. 14 may be the structure of the third data of a block in which the luma signal block Y, the first chroma signal block Cb and the second chroma signal block Cr are combined in the concatenation mode ①. Therefore, there are three k value codes and three QP codes. Specifically, the payload includes a k value code of the luma signal block Y, a k value code of the first chroma signal block Cb, a k value code of the second chroma signal block Cr, a QP code of the luma signal block Y, a QP code of the first chroma signal block Cb. and a QP code of the second chroma signal block Cr.

The order of the k value code of the luma signal block Y, the k value code of the first chroma signal block Cb, the k value code of the second chroma signal block Cr, the QP code of the luma signal block Y, the QP code of the first chroma signal block Cb, the QP code of the second chroma signal block Cr. and the binary code can vary.

In an embodiment, the three k value codes are shared. Therefore, when the same k value is shared, there is only one k value code. When two of the three planes share a k value code, there is only two k value codes.

Likewise, the three QP codes may be shared. Therefore, when the same QP code is shared, there is only one QP code. When two of the three planes share a QP code, there is only two QP codes.

An image processing device according to an exemplary embodiment of the inventive concept will now be described with reference to FIGS. 1 through 6 and 15.

Figure 15:
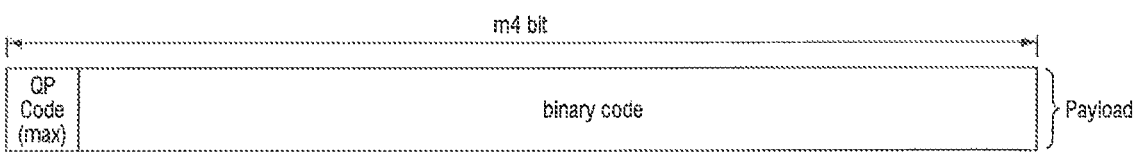
FIG. 15 illustrates the structure of data lossy compressed by an image processing device according to an exemplary embodiment of the present inventive concept.

FIG. 15 illustrates the structure of data lossy compressed by an image processing device according to an exemplary embodiment of the present inventive concept.

Referring to FIGS. 1 through 6 and 15, in the lossy mode, a payload may include only a binary code and a maximum QP code without a k value code. Here, a QP stored in the maximum QP code may be a maximum value from among possible QPs. If pixel data has a value of 0 to $2^8-1$ (=255), the QP may be defined as $1/(2^n-1)$ (where n is an integer of 8 or less). However, the current embodiment is not limited to this case.

In an embodiment, an entropy encoding module 215 performs entropy coding by allocating bits according to the frequency of similar data. If the QP is the maximum value, the frequency of similar data is not high. Therefore, performing entropy encoding can increase data size.

Hence, the second data of the image processing device according to an embodiment of the inventive concept is directly converted into the third data by a quantization module 213 of an encoder 210 and does not pass through the entropy encoding module 215.

Therefore, when the QP of the quantization module 213 has the maximum value, the encoder 210 of the image processing device according to an embodiment does not include the k value code in the payload and includes only the binary code and the maximum QP code in the payload.

An image processing device according to an exemplary embodiment will now be described with reference to FIG. 16.

Figure 16:
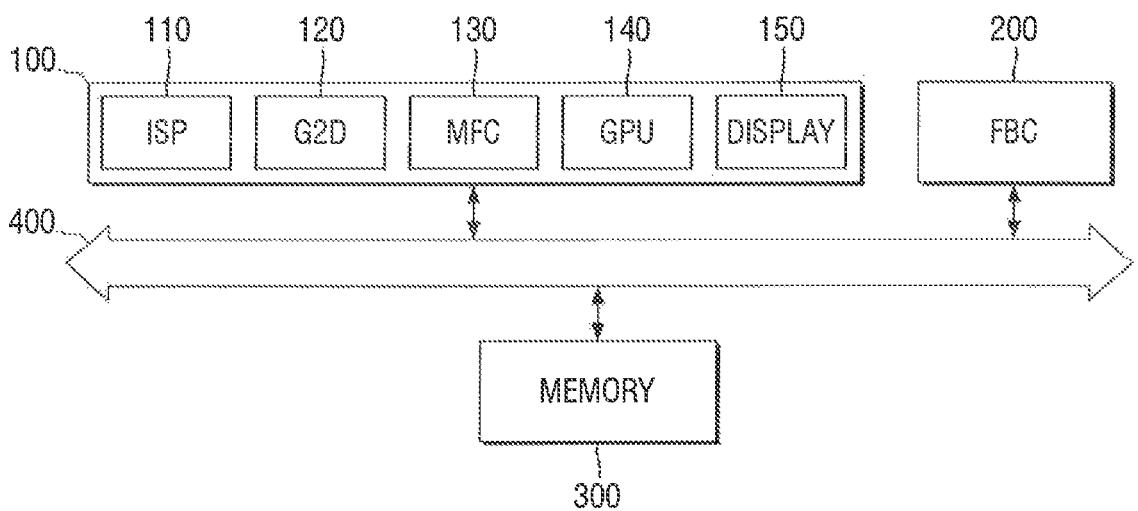
FIG. 16 is a block diagram of an image processing device according to an exemplary embodiment of the inventive concept.

FIG. 16 is a block diagram of an image processing device according to an exemplary embodiment of the inventive concept.

Referring to FIG. 16, an FBC 200 of the image processing device according to an exemplary embodiment of the inventive concept is directly connected to a system bus 400.

The FBC 200 is not directly connected to a multimedia IP 100 but is connected to the multimedia IP 100 through the system bus 400. Specifically, each of an ISP 110, a G2D 120, an MFC 130, a GPU 140 and a display 150 of the multimedia IP 100 may exchange data with the FBC 200 through the system bus 400 and transmit data to a memory 300 through the system bus 400.

That is, in a compression operation, each of the ISP 110, the G2D 120, the MFC 130, the GPU 140 and the display 150 of the multimedia IP 100 may transmit the second data (i.e., the uncompressed data) to the FBC 200 through the system bus 400. Then, the FBC 200 may compress the second data into the third data and transmit the third data (i.e., the compressed data) to the memory 300 through the system bus 400.

Similarly, in a decompression operation, the FBC 200 may receive the third data stored in the memory 300 through the system bus 400 and decompress the third data into the second data. Then, the FBC 200 may transmit the second data to each of the ISP 110, the G2D 120, the MFC 130, the GPU 140 and the display 150 of the multimedia IP 100 through the system bus 400.

In the embodiment of FIG. 16, although the FBC 200 is not directly connected to the ISP 110, the G2D 120, the MFC 130, the GPU 140 and the display 150 of the multimedia IP 100, it can indirectly connected to the ISP 110, the G2D 120, the MFC 130, the GPU 140 and the display 150 of the multimedia IP 100 through the system bus 400. Therefore, hardware configuration can be simplified, and operation speed can be improved.

An image processing device according to an exemplary embodiment of the inventive concept will now be described with reference to FIG. 17.

Figure 17:
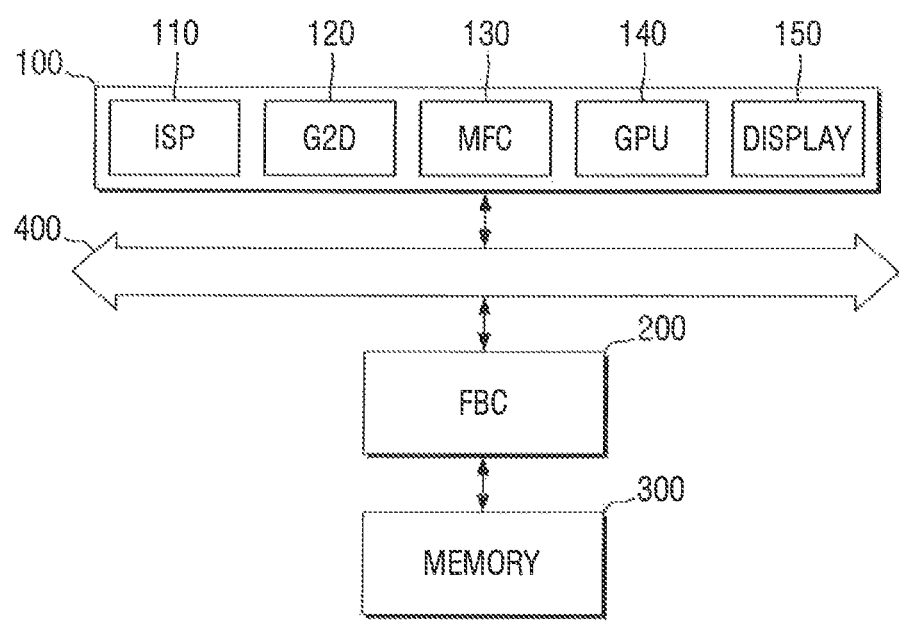
FIG. 17 is a block diagram of an image processing device according to an exemplary embodiment of the inventive concept.

FIG. 17 is a block diagram of an image processing device according to an exemplary embodiment of the inventive concept.

Referring to FIG. 17, the image processing device according to the embodiments is configured such that a memory 300 and a system bus 400 are connected to each other through an FBC 200.

That is, the memory 300 is not directly connected to the system bus 400 and is connected to the system bus 400 only through the FBC 200. In addition, an ISP 110, a G2D 120, an MFC 130, a GPU 140 and a display 150 of a multimedia IP 100 may be directly connected to the system bus 400. Therefore, the ISP 110, the G2D 120, the MFC 130, the GPU 140 and the display 150 of the multimedia IP 100 can access the memory 300 only through the FBC 200.

Since the FBC 200 is involved in all accesses to the memory 300 in the current embodiment, the FBC 200 may be directly connected to the system bus 400, and the memory 300 may be connected to the system bus 400 through the FBC 200. This can reduce errors in data transmission and improve operation speed.

What is claimed is:

1. An image processing device comprising:
   a multimedia intellectual property (IP) configured to receive and process first image data and generate and use second image data;
   a frame buffer compressor configured to compress the second image data into third image data and decompress the third image data into the second image data;
   a memory configured to store the third image data and accessed by the multimedia IP,
   wherein the frame buffer compressor performs compression or decompression when the multimedia IP accesses the memory, the frame buffer compressor operates in a lossy compression mode or a lossless compression mode, the lossless compressed third image data includes a first payload and a first header, the first header includes an index, and the lossy compressed third image data includes second payload only, and the second payload is compressed by a preset compression ratio,
   where the index is a single value that maps to one of a plurality of different compression ratio ranges of the first payload.

2. The image processing device of claim 1, wherein a size of the first payload is an integer multiple of a size of a data access unit of the memory.

3. The image processing device of claim 1, wherein the first payload includes a first binary code and a first k value code, the first binary code is the second image data entropy encoded and the first k value code represents a k value of the entropy encoded first binary code, and wherein the second payload includes a second binary code and a second k value code, the second binary code is the second image data entropy encoded.

4. The image processing device of claim 3, wherein the second binary code is quantized by a predetermined quantization parameter (QP), the second payload includes a QP code, and the QP code indicates the QP of the second binary code.

5. The image processing device of claim 1, wherein the second image data is encoded into YUV and includes a luma signal block, a first chroma signal block and a second chroma signal block.

6. The image processing device of claim 5, wherein the frame buffer compressor operates first to third modes, in the first mode, the frame buffer compressor compresses the luma signal block, the first chroma signal block and the second chroma signal block of the second image data together, in the second mode, the frame buffer compressor compresses the first chroma signal block and the second chroma signal block of the second image data together and separately compresses the luma signal block of the second image data, and in the third mode, the frame buffer compressor compresses the luma signal block, the first chroma signal block and the second chroma signal block of the second image data respectively.

7. The image processing device of claim 6, wherein the third image data includes a binary code which is the compressed second image data, in the first mode and the second mode, the binary code includes data about each pixel, and the data about each pixel includes the data of a different plane.

8. The image processing device of claim 6, wherein the third image data includes a binary code and a k-value code, the binary code is the second image data entropy encoded and the k-value code indicates a k-value of the entropy encoded binary code, the k-value code has a first size when the third image data is compressed in the third mode, the k-value code is one or twice a size of the first size when the third image data is compressed in the second mode, and the k-value code is one, twice or three-times a size of the first size when the third image data is compressed in the first mode.

9. The image processing device of claim 6, wherein a binary code is quantized by a predetermined quantization parameter (QP), the third image data includes a QP code, the QP code indicates a QP of the binary code, the QP code has a second size when the third image data is compressed in the third mode, the QP code is one or twice a size of the second size when the third image data is compressed in the second mode, the QP code is one, twice or three-times a size of the second size when the third image data is compressed in the first mode.

10. The image processing device of claim 5, wherein a size ratio of the luma signal block, the first chroma signal block and the second chroma signal block in the second image data is 4:1:1 or 4:2:2.

11. An image processing device comprising:
   a multimedia intellectual property (IP) configured to receive and process first image data and generate and use second image data;
   a frame buffer compressor configured to compress the second image data into third image data and decompress the third image data into the second image data; and
   a memory configured to store the third image data to be accessed by the multimedia IP, and wherein the frame buffer compressor includes,
an encoder configured to compress the second image data into the third image data; and
a decoder configured to decompress the third image data into the second image data, wherein the encoder includes a prediction module to divide and represent prediction data and residual data and an entropy encoding module to perform entropy encoding on the second image data and compress the encoded second image data according to a k-value code, the decoder includes a prediction compensation module to decode the prediction data and the residual data into the second image data and an entropy decoding module to decode the third image data according to the k-value code located within a payload of the third image data,
the k-value code includes at least one k value for color signal blocks of the second image data, and
the third image data is generated based on an entropy table corresponding to the k-value code.

12. The image processing device of claim 11, wherein the encoder includes a quantization module to quantize the second image data based on a quantization parameter (QP) and compress the quantized second image data, the decoder includes an inverse quantization module to decode the second image data based on the QP.

13. The image processing device of claim 12, wherein the frame buffer operates in a lossy mode or a lossless mode, in the lossless mode, the second image data is transformed a compression data by the prediction module and the entropy encoding module, in the lossy mode, the second image data is compressed to the third image data by the prediction module, the quantization module and the entropy encoding module.

14. The image processing device of claim 12, further comprising:
a padding module configured to generate the third image data for padding corresponding to a size of the compressed data and a header indicating a compression ratio of the third image data.

15. The image processing device of claim 14, wherein the padding module is configured such that a size of the compression data is a first integer multiple of a size of a data access unit of the memory by the padding, and the compression ratio corresponds to the first integer.

16. An image processing device comprising:
a multimedia intellectual property (IP) configured to receive and process first image data and generate and use second image data;
a frame buffer compressor configured to compress the second image data into third image data and decompress the third image data into the second image data; and
a memory configured to store the third image data to be accessed by the multimedia IP, and
wherein the frame buffer compressor is configured to perform the compressing or the decompressing whenever the multimedia IP accesses the memory, the second image data includes a luma signal block, a first chroma signal block and a second chroma signal block, which is encoded into YUV, wherein the frame buffer compressor operates first to third modes, in the first mode, the frame buffer compressor compresses the luma signal block, the first chroma signal block and the second chroma signal block of the second image data together, in the second mode, the frame buffer compressor compresses the first chroma signal block and the second chroma signal block of the second image data together and separately compresses the luma signal block of the second image data, and in the third mode, the frame buffer compressor compresses the luma signal block, the first chroma signal block and the second chroma signal block of the second image data respectively.

17. The image processing device of claim 16, wherein the multimedia IP includes an image signal processor to transform the first image data into the second image data and transfer the second image data to the frame buffer compressor, the first image data is RGB format data and the second image data is YUV format data.

18. The image processing device of claim 17, wherein the multimedia IP includes a multi-format codec to receive the second image data from the frame buffer compressor and compress the second image data and return the compressed second image data to the frame buffer compressor.

19. The image processing device of claim 18, further comprising:
a shake correction module configured to receive the second image data from the frame buffer compressor, perform a shake correction on the second image data and return the corrected second image data to the frame buffer compressor.

20. The image processing device of claim 17, further comprising:
a graphic processing unit (GPU) configured to receive the second image data from the frame buffer compressor, perform a graphic processing for the second image data and return the processed data to the frame buffer compressor.

* * * * *